United States Patent [19]

Dubbs et al.

[11] Patent Number: 4,686,766
[45] Date of Patent: Aug. 18, 1987

[54] METHOD OF FORMING A FLEXIBLE STRIP OF ENCAPSULATED CONTACT MEMBERS

[75] Inventors: Jack F. Dubbs, Harrisburg; Clyde K. Hanyen, Mechanicsburg, both of Pa.

[73] Assignee: AMP Incorporated, Harrisburg, Pa.

[21] Appl. No.: 827,923

[22] Filed: Apr. 7, 1986

Related U.S. Application Data

[60] Division of Ser. No. 682,480, Dec. 17, 1984, Pat. No. 4,586,607, which is a continuation of Ser. No. 453,310, Dec. 27, 1982, abandoned.

[51] Int. Cl.⁴ ............................................. H01R 43/00
[52] U.S. Cl. ......................................... 29/883; 29/884; 264/165; 264/166; 264/250; 264/271.1; 264/167
[58] Field of Search ................... 29/883, 884; 206/329, 206/346; 264/165–167, 271.1, 250, 255, 264, 294, 156, 296, 328.1, 328.11

[56] References Cited

U.S. PATENT DOCUMENTS

| | | | |
|---|---|---|---|
| 3,192,298 | 6/1965 | Fisher | 264/296 |
| 3,877,769 | 4/1975 | Berg et al. | 339/116 C X |
| 3,899,232 | 8/1975 | Berg et al. | 339/119 R X |
| 4,008,302 | 2/1977 | Erlichman | 264/156 |
| 4,404,744 | 9/1983 | Stenz et al. | 29/883 |
| 4,422,708 | 12/1983 | Birnholz | 206/329 X |
| 4,445,836 | 5/1984 | Dawson | 264/167 X |
| 4,586,607 | 5/1986 | Dubbs et al. | 206/329 |
| 4,615,927 | 10/1986 | Holzmann | 206/329 X |

Primary Examiner—Howard N. Goldberg
Assistant Examiner—Taylor J. Ross
Attorney, Agent, or Firm—Allan B. Osborne

[57] ABSTRACT

A continuous strip of spaced-apart electrical contacts is taught. Briefly stated, a mold structure is utilized to position a plurality of contacts in a mold. A polymeric material such as silicone is thereafter injected into the mold which fills the interior portion of the contact as well as encapsulating the exterior upper portion of the contact, thereby producing a strip of spaced-apart electrical contacts having a molded carrier strip of flexible polymeric material. The strip is advanced such that a portion remains in the mold. The mold is then refilled with additional contacts, and the material is again injected to encapsulate the additional contacts as well as to secure this strip to the previous strip.

4 Claims, 11 Drawing Figures

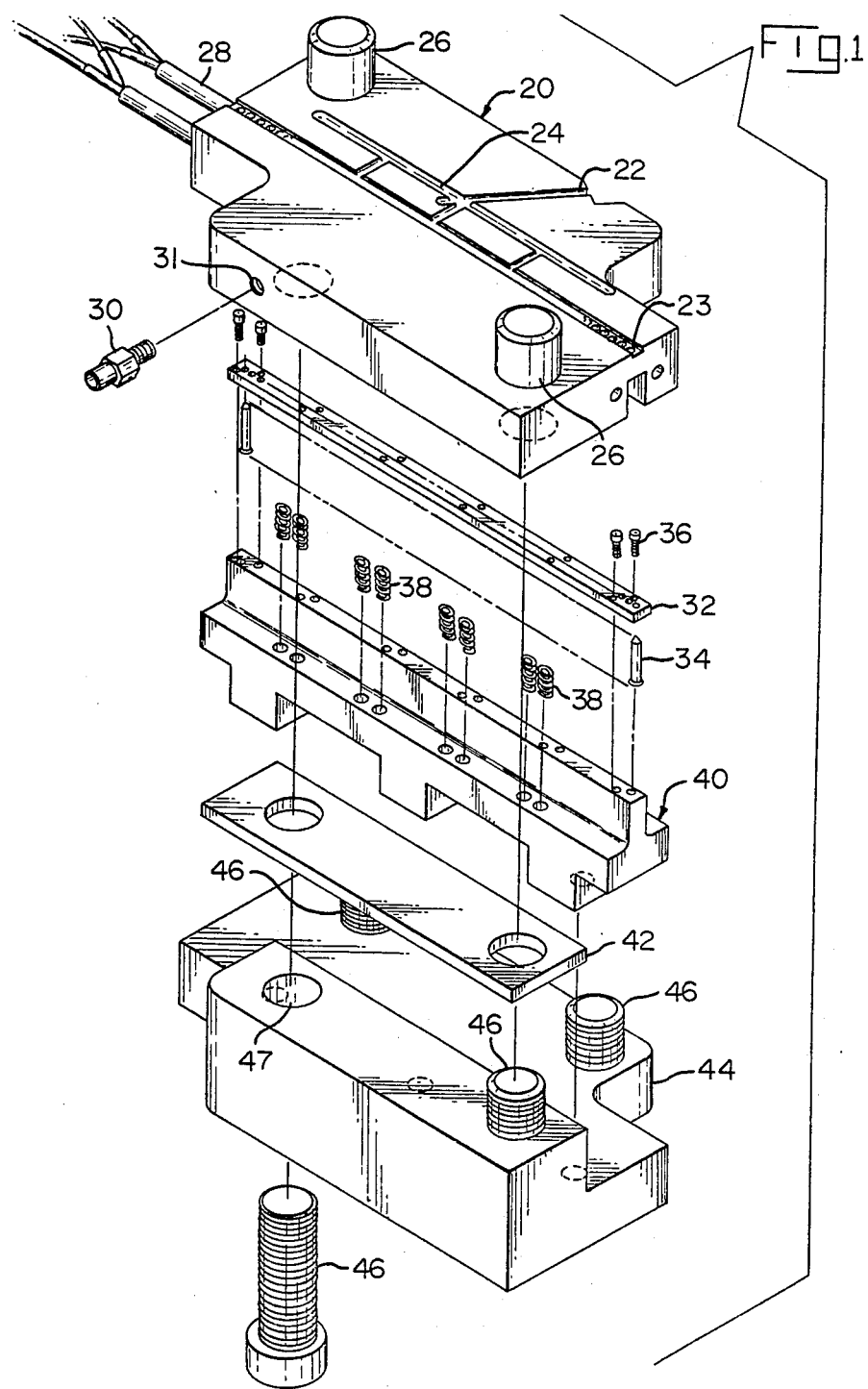

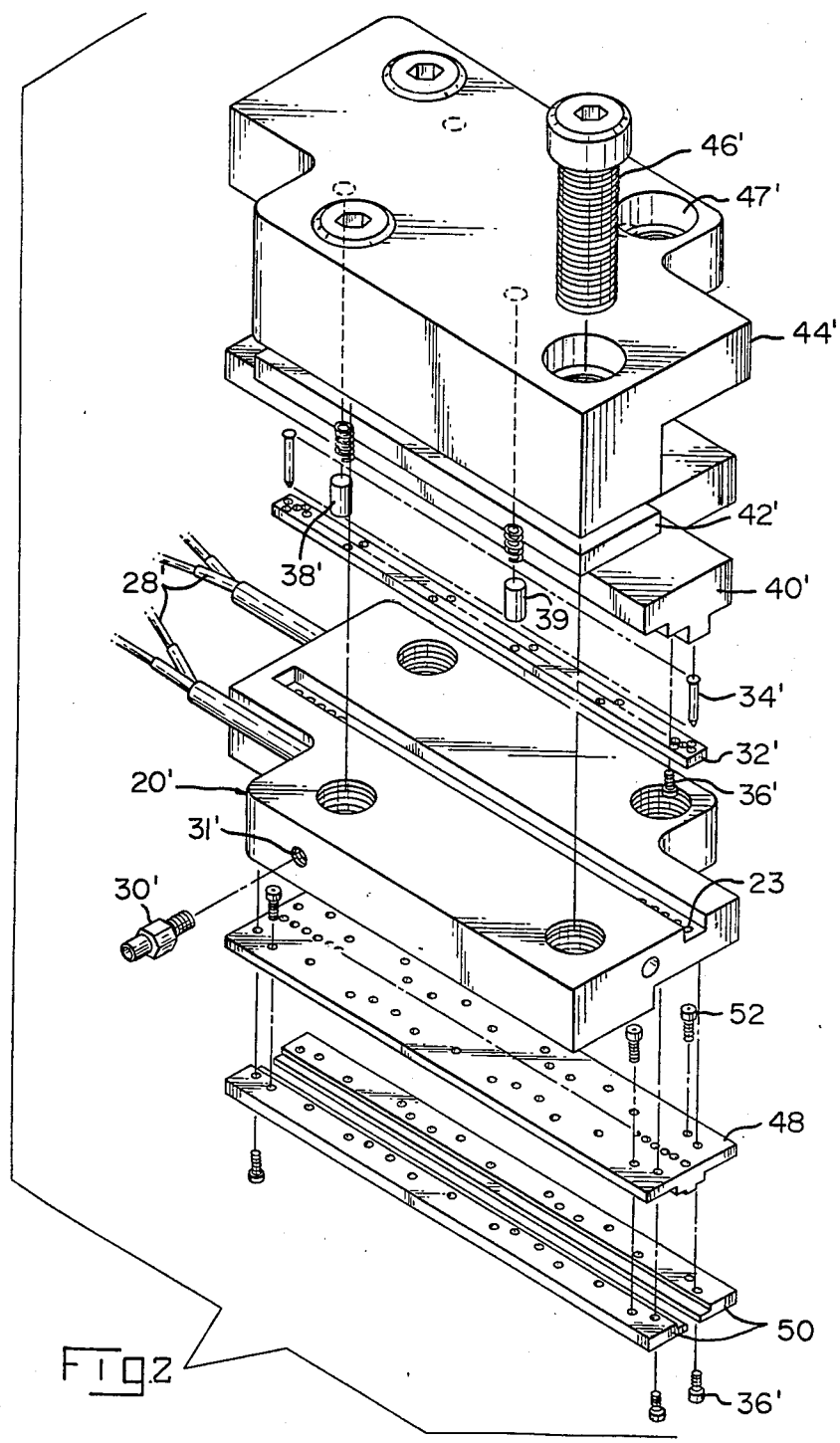

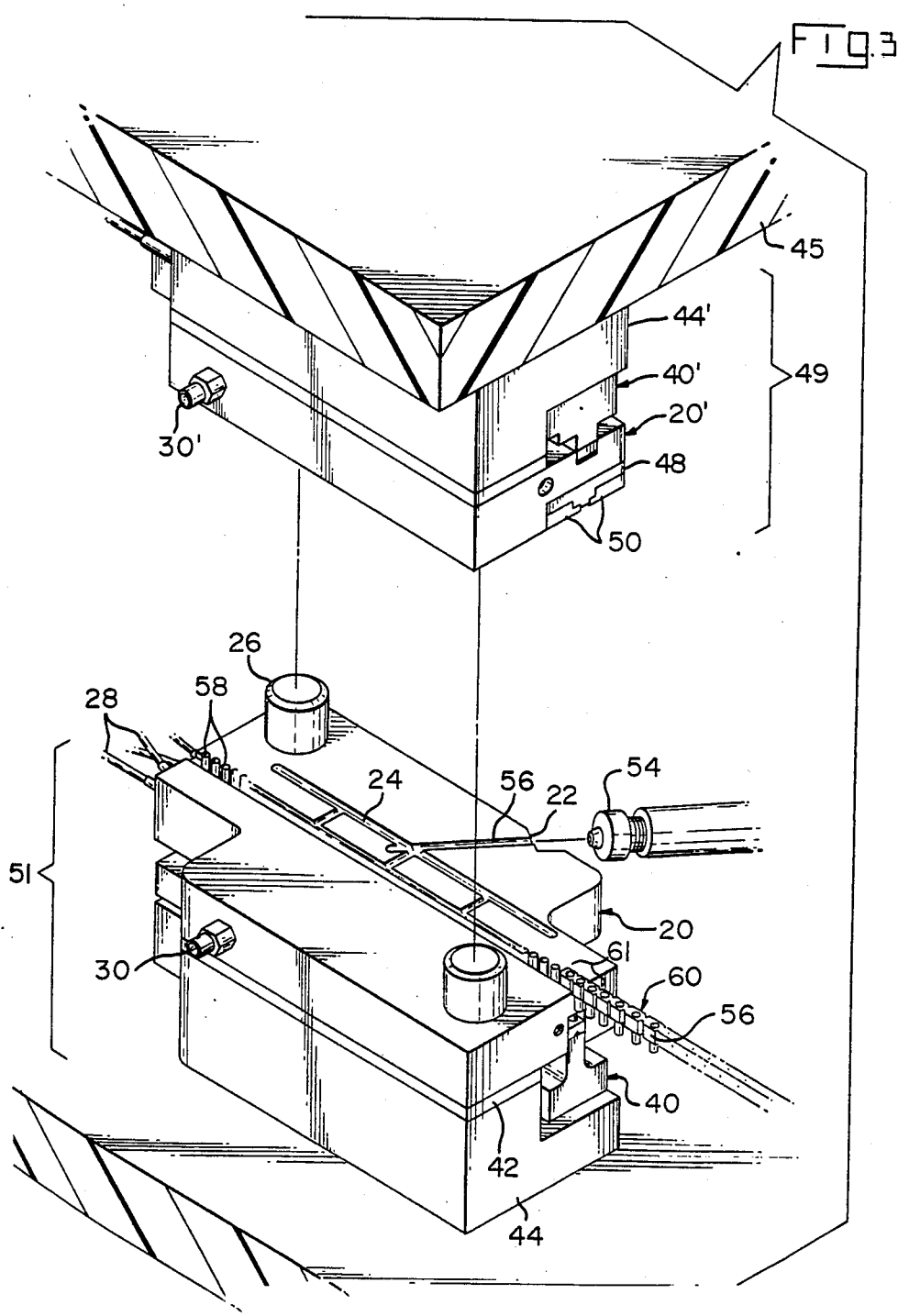

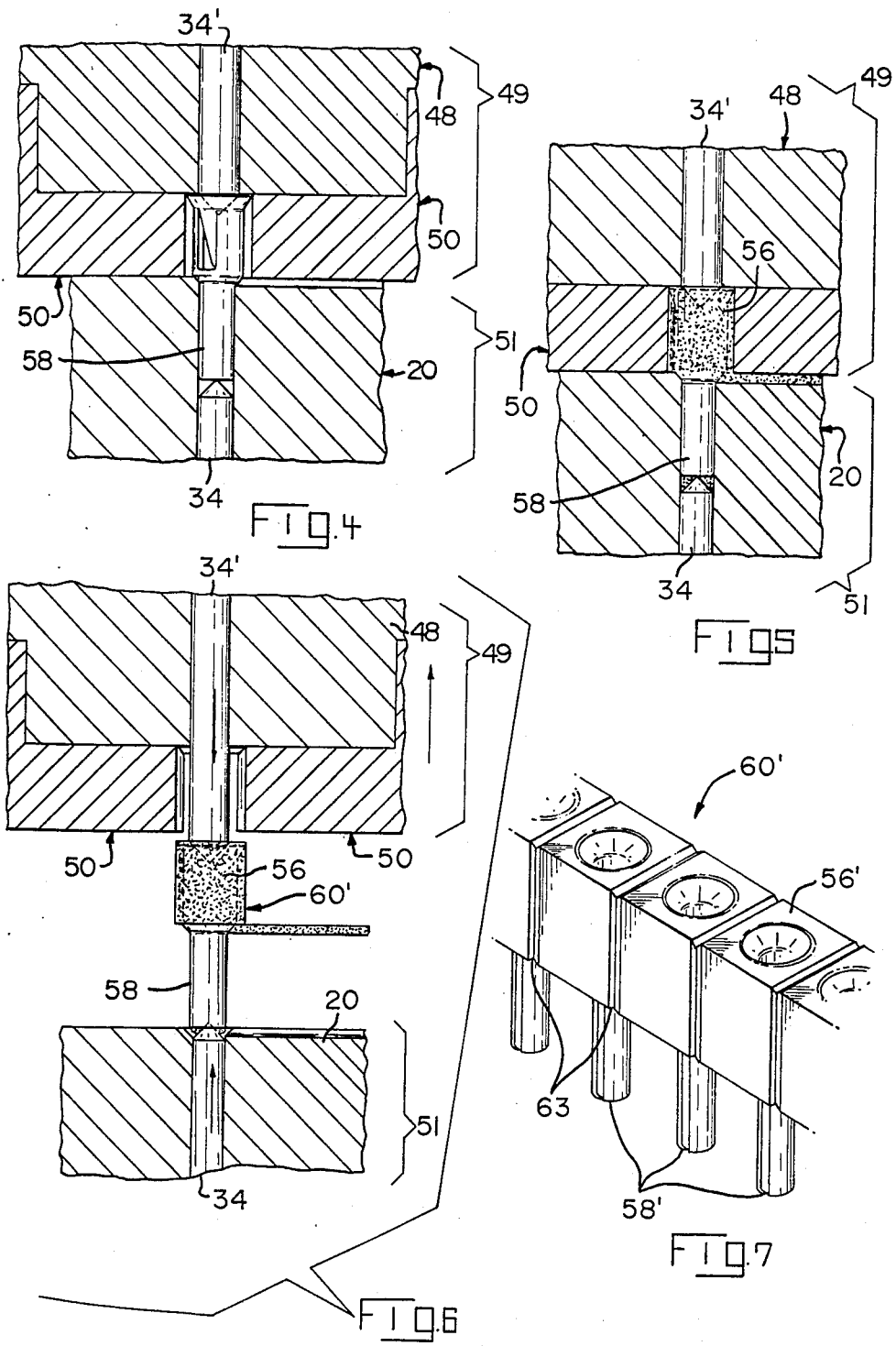

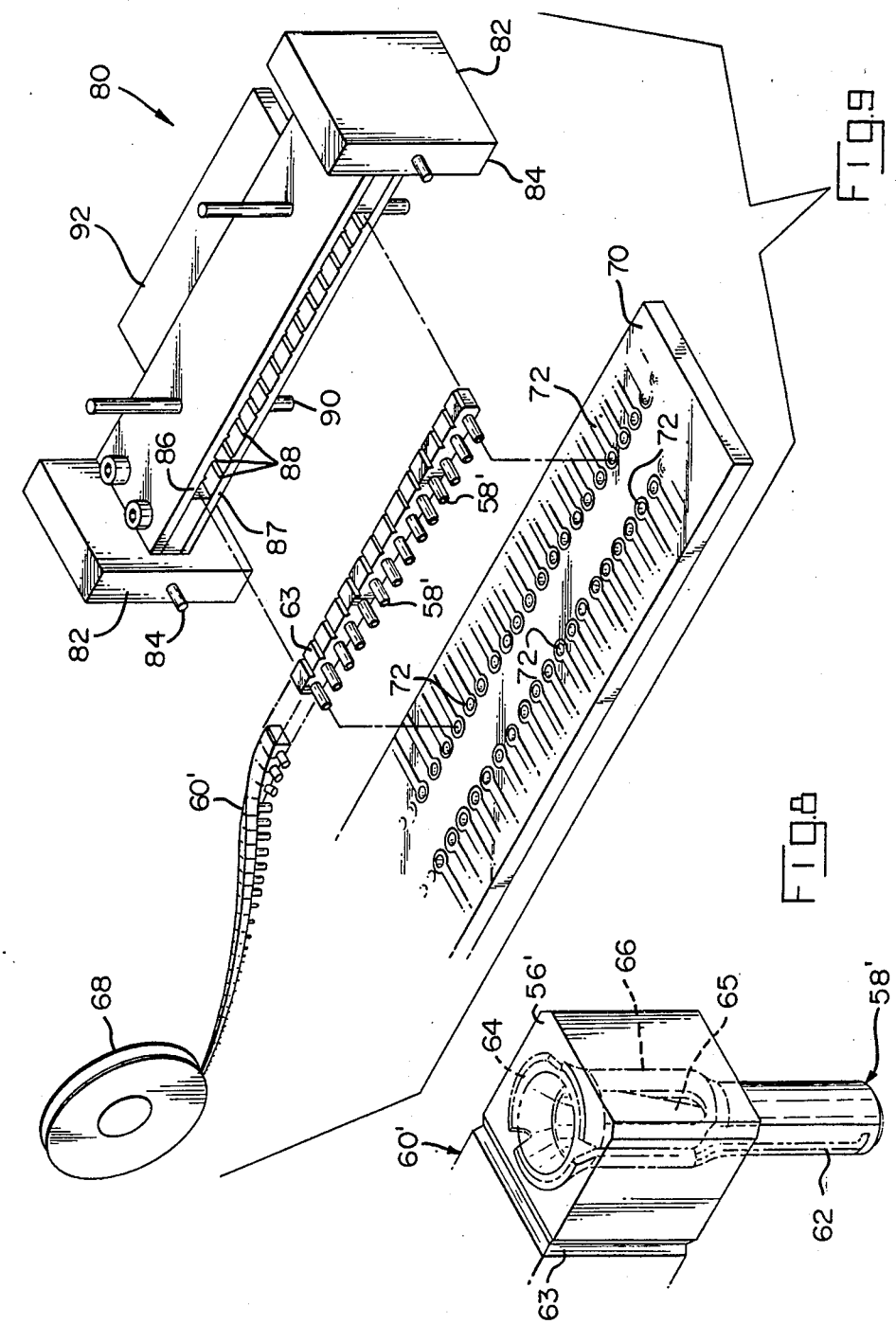

METHOD OF FORMING A FLEXIBLE STRIP OF ENCAPSULATED CONTACT MEMBERS

This is a division, of application Ser. No. 682,480, filed Dec. 17, 1984, now U.S. Pat. No. 4,586,607, which is a continuation of Ser. No. 453,310, filed Dec. 27, 1982, now abandoned.

This invention, generally, to strip usage of contact members and more particularly, to encapsulation of contact members with an elastomeric substance such as silicone.

In the world of high speed manufacturing, electrical components in strip form is common. Such an example may be found in U.S. Pat. No. 2,954,117 "Electrical Circuit Component And Method Of Producing Same Enmasse" issued Sept. 27, 1962 W. S. Freeburg. This teaches the use and method of forming or making electrical components enmasse in a string. However, the state of the art has advanced over Freeburg to the point where the use of carrier strips made of paper, plastic and/or metal for automatic machine usage is quite common. Additionally, the art has advanced to where the use of the strip is an integral part of the function of the component associated therewith. An example of this may be found in U.S. Pat. No. 4,149,768 "Composite Strip of Thermoplastic Articles And Method Of Manufacturing Same" issued Apr. 17, 1979 to Weis and which utilizes thermoplastics for continuous strip purposes and as well as providing a housing for electrical connectors. However, such means of strip utilization do not provide or allow for variances in spacing in that the strip may not be expanded or contracted. While some arts such as found in U.S. Pat. No. 3,899,232 "Circuit Board Socket" issued Aug. 12, 1975 to Berg deceased et al and U.S. Pat. No. 3,877,769 "Circuit Board Socket" issued Apr. 15, 1975 to Berg, deceased, et al utilize silicone rubber inside a contact to seal the inside of the contact it is only the interior of the socket or contact which is filled leaving open the problem of manufacturing such sockets in the continuous strip form while facilitating automatic machine insertion into a circuit board.

It is desirable to have an article which is produceable in a continuous form and which is elastomeric so as to be capable of usage with differing interspace requirements which is accomplished simply by stretching or contraction of the material comprising the carrier strip thereby changing the centering of the product contained in the strip. It is also advantageous to provide a carrier strip which in addition to allowing different centering or spacing arrangements is of such a nature so as to environmentally seal the product. It is also desirable to have a carrier strip which is relatively inexpensive as well as easy to manufacture. Such a scheme is taught in the present invention.

Accordingly, the present invention relates to a continuous strip of spaced-apart electrical contact sockets, each socket having a conductor receiving end, a hollow conductor receiving body and a mounting portion at the end of the socket opposite the conductor receiving end, each hollow conductor receiving body being totally encapsulated and the conductor receiving end being partially encapsulated, the strip being characterized in that the strip comprises a continuously molded carrier strip of flexible polymeric material having oppositely facing sidewalls and oppositely facing end walls, the contact sockets being insert molded in the carrier strip with the conductor receiving body being essentially perpendicular to the length of the carrier strip, the conductor receiving end of the sockets being in one of the end walls of the strip and the mounting portion of the socket extending below the other end wall of the strip, and having oppositely positioned recesses in the side walls disposed between the contact sockets.

BRIEF DESCRIPTION OF THE DRAWINGS

Reference is now made to the description of the preferred embodiment illustrated in the accompanying drawings, in which:

FIG. 1 is an isometric exploded view of a portion of the mold for making the carrier strip of the present invention;

FIG. 2 is an isometric partly exploded view of another part of the mold of the present invention;

FIG. 3 is an assembled view of the molds shown in FIGS. 1 and 2 and their relationship with respect to each other;

FIG. 4 is a cross-sectional view taken through the molds before the injection of a silicone rubber;

FIG. 5 is a view similar to that in FIG. 4 after the injection of a silicone rubber;

FIG. 6 is a view similar to that in FIGS. 4 and 5 with the molds separated and the strip being removed from the molds;

FIG. 7 is a perspective view of the carrier strip of the present invention;

FIG. 8 is an isometric view of the contact and its relationship to the carrier strip of the present invention;

FIG. 9 is an illustrative example of the carrier strip of the present invention in conjunction with an insertion tool;

DESCRIPTION OF THE PREFERRED EMBODIMENT

Figure 10:
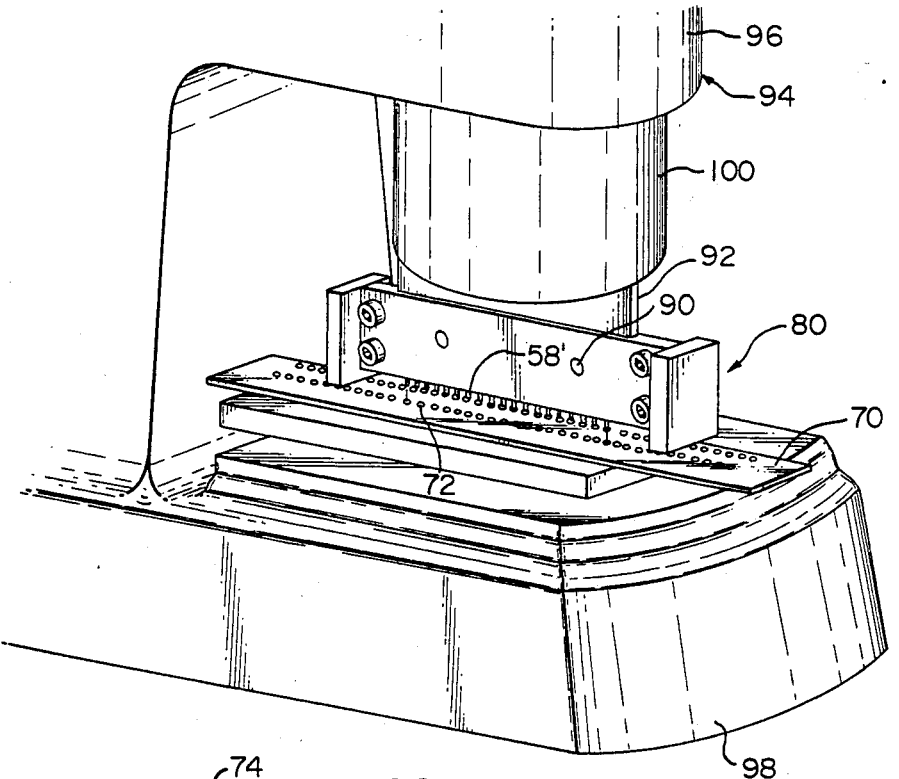
FIG. 10 is an isometric view of an insertion tool for inserting the carrier strip of the present invention into a circuit board.

Referring now to FIG. 1, there is shown an isometric partially exploded view of a portion of the mold of the present invention. Shown is a cavity mold shown generally at 20 which has an inlet or spru 22 and which enters into a runner 24. The runner 24 is used for flow of the elastomeric strip material (shown in FIGS. 3, 5, 7, 8, 9 and 11). Positioned on top of the cavity mold 20 are two positioning pins 26 which are utilized for alignment of a mating mold member (shown in FIGS. 2 and 3). Shown also are heater wires 28 which keep the mold 20 at the desired temperature. A thermocouple 30 is inserted into the thermocouple mounting aperture 31 and which is used for sensing the temperature of the mold 20. Through suitable circuitry which is readily available to one skilled in the art, the heater wires 28 positioned in the cavity mold 20 are cycled and thereby insure proper thermocycling of the mold 20. Shown also is an ejector pin retainer 32 which is used to position and retain ejector pins 34. The purpose of the ejector pins is to remove the product (not shown) from the mold 20. Mounting screws 36 are used to attach the ejector pin retainer 32 to the ejector block 40. Retainer springs 38 are utilized to provide proper tension during the ejection cycle. A spacer 42 is located between the cavity mold 20 and the base 44, with the entire assembly being held together by retaining bolts 46.

Referring now to FIG. 2, there is shown an isometric, partially exploded view of the mating portion of the mold of the present invention. It is to be remembered that components similar in structural operation to previously described components will be identified by the previously assigned numeral with the addition of a prime ('). Here there is shown retainer bolts 46' which pass through retaining bolt mounting holes 47' for fixedly holding the entire assembly together as shown. A base 44' is utilized as well as a spacer 42'. An ejector block 40' is also utilized although differing slightly in shape but performing a function similar to the ejector block 40 of FIG. 1 and whose operation will be described in detail below. Again, retainer springs 38' are utilized and have retainer spring sleeves 39 positioned therearound. Ejector pins 34' are utilized in conjunction with an ejector pin retainer 32', with the retainer 32' again being held in place by mounting screws 36'. Heater wires 28' are utilized with a thermocouple 30' disposed in the thermocouple mounting aperture 31' of the cavity mold 20'. A cavity mold upper plate 48 is mounted by use of cavity mold plate screws 52 to the cavity mold lower plates 50 with the entire assembly 48, 50 being mounted by mounting screws 36' to the cavity mold 20' and thereby forming a complete structure.

Referring now to FIG. 3, there is shown the apparatus of FIGS. 1 and 2 assembled in juxtaposition to each other and ready for use in making the elastomeric strip of the present invention. Here the upper mold assembly shown generally at 49 which is comprised of the components from FIG. 2 and which is mounted to a machine base 45 is positioned over the lower mold assembly shown generally at 51. The lower mold assembly 51 is comprised of the assembled components of FIG. 1. Also shown is an injector 54 which is utilized for injecting silicone 56 through the inlet 22 into the runner 24. Positioned in the runner 24 are contact sockets 58 which are placed in the runner 24.

In referring to FIGS. 1 through 6, and in particular FIGS. 3 through 6, construction of the contact strip 60 may be understood. Contact sockets 58 are inserted into the runner 24 such that the mounting portions 62 (FIG. 8) of the contact sockets 58 are inserted through contact spacing apertures 23 (FIG. 1). The upper and lower mold assemblies 49, 51 are then mated. The injector 54 then injects silicone 56 through the inlet 22 into the runner 24. The heater wires 28, 28' in conjunction with the thermocouples 30, 30' maintain the temperature of their respective assemblies within suitable margins so as to ensure optimum temperature for the insertion and subsequent gelling or hardening of the silicone 56. The silicone 56 is injected into the runners 24 with sufficient pressure so as to ensure that substantially all voids are filled. The silicone 56 is then allowed to cure to a temperature sufficient so as to retain the shape of the mold and in the preferred embodiment of the present invention is at approximately 425° F. although other temperatures can and may be used. The upper and lower mold assemblies 49, 51 are then separated and through the use of the injector pins, 34, 34' the contact sockets 58 are removed from their respective portions of the mold. Thusly, a contact strip 60 is formed. The contact strip 60 is then advanced in the mold with a portion of the contact strip being reinserted into the mold such that a strip end 61 in reinserted into the runner 24 and thereby the contact spacing apertures 23. Another set of contact sockets 58 is inserted into the runner 24 and the respective contact spacing apertures 23. In a manner similar to that just described the upper and lower mold assemblies 49, 51 are closed with silicone 56 injected. In that the strip ends 61 are reinserted into the mold, the subsequent injection of silcone 56 allows a bond to be formed between the strip end 61 and the newly formed contact strip 60, thereby forming a continuous contact strip 60. In this manner the process is repeated forming a contact strip of any desirable or suitable length.

Referring now to FIG. 7, there is shown a portion of a finished contact strip 60'. Here it can be seen how the silicone 56' completely encapsulates the upper portion of the contact sockets 58'. The contact strips 60' has contact strip notches 63 disposed therein and which are utilized for providing additional flexibility to the overall contact strips 60' as well as providing demarcation notches for insertion of the strip into a circuit board (shown in FIG. 10).

Referring now to FIG. 8, there is shown a more detailed view of a contact socket 58' and its interrelation to the contact strip 60'. Here it can be seen that the contact socket 58' is comprised of a mounting portion 62, a conductor receiving end 64, and a hollow conductor receiving body 66 having conductor retaining tabs 65 contained therein. Silicone 56' completely encapsulates the upper portion of the contact socket 58 and therefore completely surrounds the hollow conductor receiving body 66 as well as completely filling the interior of the contact 58'.

Referring now to FIG. 9, there is shown a long continuous strip of contact strips 60' which have been rolled onto a reel 68. Shown also is a number of contacts separated from the continuous strip 60' and which are to be inserted into the circuit board 70. It is to be understood that fewer contacts or more contacts may be inserted without departing from the spirit and scope of the present invention. Shown also is a hand tool or insertion die 80 which is utilized to insert a contact strip 60' into the contact mounting hole 72 on the circuit board 70. The insertion die shown generally at 80 is comprised of end members 82 each of which has locating pins 84 which are inserted into contact mounting holes 72 thereby aligning the die 80 on the circuit board 70 (as shown in FIG. 10). The die 80 has an upper contact strip retainer 86 and a lower contact strip 87 which are used to hold and retain a contact strip 60'. The upper and lower contact strip retainers 86, 87 have ridges 88 which align with the contact strip notches 63. In this manner when a strip of contact strip 60' is inserted into the die 80, the center-to-center spacing between contact sockets 58' can be adjusted and/or corrected to coincide with the proper center-to-center spacing of the contact mounting holes 72. Retaining pins 90 hold the contact insertion bar 92 in place and are removed just prior to insertion of the contact strip 60' into the contact mounting holes 72' (shown in FIG. 10).

Referring now to FIG. 10 there is shown a contact strip 60' contained in the insertion die 80 ready to be inserted into the circuit board 70 by a press shown generally at 94. The press 94 has an upper arm 96 and a base 98 with a jaw 100 disposed in the upper arm 96. The jaw 100 moves vertically up or down in which thereby urges the contact insertion bar 92 vertically downward thereby forcing the contact sockets 58' contained in the contact strip 60' into the contact mounting holes 72 contained in the circuit board 70. The movement of the jaw 100 is accomplished by use of a movable arm or lever (not shown) similar to that of a drill press although the jaw 100 does not rotate and which is readily obvious to one skilled in the art.

Figure 11:
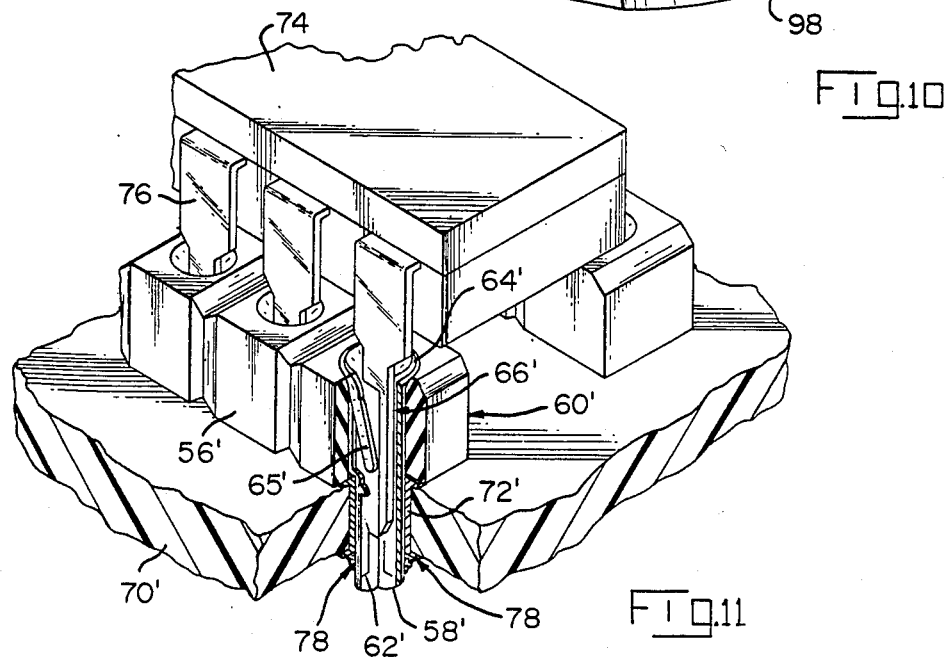
FIG. 11 is a partial cross-sectional view of a dual-in-line plug integrated circuit being utilized with the carrier strip and associated contacts of the present invention.

Referring now to FIG. 11, there is shown an application of the present invention in conjunction with a circuit board 70' and an electronic component. Here it can be seen how the mounting portion 62' was placed through a contact mounting hole 72' and soldered 78 to a portion of a conductive path disposed on the underside of the circuit board 70' (not shown) although depending upon the contact chosen soldering may not be necessary. An integrated circuit 74 having integrated circuit pins 76 disposed thereon is mated with the contact sockets 58'. The integrated circuit pins 76 enter the conductor receiving end 64' into the hollow conductor receiving body 66' and make electrical contact with conductor retaining tabs 65'. In that the interior of the contact socket 50' is completely filled with the silicone 56', insertion of the integrated circuit pin 76 forces the silicone 56' to be moved such that electrical contact is established between the integrated circuit pins 76 and the contact sockets 58' and in particular to the conductor retaining tab 65'. Upon removal of the integrated circuit 74, containing the integrated circuit pins 76, the silicone 56' in an elastomeric fashion returns to its original position thereby forming a substantially filled contact socket 58'. Therefore, the use of the silicone 56' in addition to providing the attributes necessary for a contact strip 60' also prevents the ingress of contaminants into the interior of the contact socket 58 as well as providing an environmental seal when a contact is in use.

It is to be understood that many variations of the present invention may be utilized without departing from the spirit and scope of the present invention. For example, materials other than silicone for forming the strip may be utilized. Automatic and/or hand insertion of contact sockets into the die may also be used while different types of dies and/or arrangements of dies may be utilized for forming a strip configuration. Additionally, different types of contact sockets may be utilized and different types of electronic apparatus other than integrated circuits such as, for example, discrete components, i.e., resistors or capacitors may be utilized. Further, different types of presses may be utilized to urge the contacts into a circuit board which may be automatic, semi-automatic or manually operable. Also, contact strip notches may be placed on only one side of the contact strip or may be spaced differently from that shown while different types of insertion dies which may be automatic or semi-automatic may be utilized.

Therefore, in addition to the above enumerated advantages, the disclosed invention produces a contact strip which is elastomeric thereby allowing the placement of the contacts associated therewith into printed circuit boards or other similar devices having different hole-to-hole spacing. Additionally, the present invention produces a relatively inexpensive, easy to manufacture contact strip.

We claim:

1. A method for making a continuous strip of spaced-apart electrical contact sockets, said sockets having a conductor receiving end, a hollow conductor receiving body, and a mounting portion at the end of the socket opposite the conductor receiving end, said method comprising the steps of:
    a. placing a plurality of the contact sockets in spaced apart relationship in a molding cavity with the mounting portions being received in apertures in said cavity;
    b. inserting a polymeric material into said molding cavity thereby encapsulating the conductor receiving end and the hollow conductor receiving body and further forming a strip of spaced-apart contact sockets by said polymeric material extending between and attached to said contact sockets;
    c. advancing said strip of contact sockets of step (b) such that a portion of said strip remains in said cavity;
    d. refilling said cavity with additional contact sockets; and
    e. inserting a polymeric material into said cavity thereby encapsulating the conductor receiving end and the hollow conductor receiving body of said additional contact sockets and further forming an additional strip of contact sockets as well as securing said additional strip of contact sockets to that portion of said strip left in said cavity thereby forming a continuous connected strips of spaced-apart electrical contact sockets.

2. The method of claim 1 further including the step of heating the molding cavity to about 425° F.

3. The method of claim 1 further including the steps of forming notches in said polymeric material between adjacent contact sockets.

4. The method of claim 1 wherein said polymeric material is a silicon.

* * * * *